United States Patent [19]

Matsunaga et al.

[11] 4,113,487
[45] Sep. 12, 1978

[54] METHOD FOR MANUFACTURE OF EXPANDED ARTICLES HAVING AN EMBOSSED SURFACE

[75] Inventors: Kazuo Matsunaga, Fussa; Hideo Ishizawa, Tokyo; Kenichi Kurata, Yokohama, all of Japan

[73] Assignee: Toppan Printing Co., Ltd., Tokyo, Japan

[21] Appl. No.: 735,523

[22] Filed: Oct. 26, 1976

[30] Foreign Application Priority Data

| Oct. 31, 1975 | [JP] | Japan | 50-131260 |
| Mar. 26, 1976 | [JP] | Japan | 51-33167 |
| Apr. 21, 1976 | [JP] | Japan | 51-46025 |
| May 12, 1976 | [JP] | Japan | 51-53972 |
| Jun. 24, 1976 | [JP] | Japan | 51-74652 |

[51] Int. Cl.² ................ G03C 5/00; G03C 11/00
[52] U.S. Cl. .................................... 96/38.1; 96/35; 96/38.2; 96/48 HD
[58] Field of Search .......... 96/35, 48 HD, 27 R, 96/36.3, 38.1, 38.2

[56] References Cited

U.S. PATENT DOCUMENTS

| 1,954,325 | 4/1934 | Martinez | 96/35 |
| 2,703,756 | 3/1955 | Herrick et al. | 96/35 |
| 2,709,654 | 5/1955 | Guth | 96/35 |
| 2,825,282 | 3/1958 | Gergen et al. | 96/35 |
| 2,911,299 | 11/1959 | Baril et al. | 96/35 |
| 3,093,478 | 6/1963 | Peterson et al. | 96/35 |
| 3,523,791 | 8/1970 | Vrancken et al. | 96/35 |
| 3,607,273 | 9/1971 | Kinney | 96/35 |
| 3,615,448 | 10/1971 | Yeshin | 96/33 |
| 4,017,312 | 4/1977 | Erskine et al. | 96/35.1 |
| 4,019,909 | 4/1977 | Cohen et al. | 96/115 P |

*Primary Examiner*—Edward C. Kimlin

[57] ABSTRACT

A method for the manufacture of an expanded article having an embossed surface comprises exposing the surface of a layer of photo-setting and expandable resin composition to partially screened light to cure only that portion of the layer of resin composition which has been exposed to the light, and then heating to expand the layer of resin composition, whereby indentations are formed in the surface.

16 Claims, 13 Drawing Figures

METHOD FOR MANUFACTURE OF EXPANDED ARTICLES HAVING AN EMBOSSED SURFACE

This invention relates to a method for the manufacture of expanded articles having an embossed surface and, more particularly, to a method for the manufacture of an expanded article having an embossed surface by utilizing the setting of a resin composition through exposure to light and thus forming indentations in the surface of the expanded article.

Conventionally, various methods for the manufacture of expanded articles having an embossed surface are well known. They include the mechanical embossing method in which the surface of an expanded article is embossed by means of dies or rolles; the chemical embossing method in which the surface of a resin composition containing a blowing agent is printed with an ink containing an expansion retarder or expansion accelerator, and then caused to expand; and the method in which a pattern of expandable resin composition is formed on a substrate by such means as printing.

By the mechanical embossing method, any desired pattern of indentations can be obtained rather freely because the pattern of indentations is formed in conformity with a design engraved on the die face. In general, however, it is difficult to increase the rate of production and to register the pattern of indentations to a printed design. Moreover, this method has the additional disadvantage of requiring an expensive and complicated apparatus. The chemical embossing method can readily provide an embossed surface registered to a design printed thereon without requiring any special equipment, but has the disadvantages that the types of useful blowing agents are limited and that part of undecomposed blowing agent will remain in the finished articles. The method of forming a pattern of expandable resin composition involves difficulty in adjusting the balance between the suitability of the expandable resin composition as a printing ink and the properties thereof desired in the finished articles, and also has the disadvantage that only restricted types of printing techniques and printing machines are useful.

In addition, another chemical method is well known in which part of the blowing agent is inactivated in advance, for example, by exposure to ultraviolet light. This method seems to be advantageous in that the conditions for subsequent processing can be easily chosen so far as the inactivation is accomplished perfectly. Nevertheless, it is not commercially practicable because of the excessive amount of energy required for the purpose of inactivation.

The above-described difficulties will be overcome by the present invention. It is therefore an object of this invention to provide a method for the manufacture of an expanded article having an embossed surface by which the influence of undecomposed blowing agent on the finished articles will be avoided, a wide variety of blowing agents may be used, and high-quality expanded articles having a pattern of indentations registered to a printed design can be obtained at a high rate of production without any complicated apparatus.

According to the present invention, there is provided a method for the manufacture of an expanded article having an embossed surface comprising the steps of providing a layer of photo-setting and expandable resin composition, exposing the surface of said layer of resin composition to partially screened light to form a cured portion and an uncured portion therein, and then heating to expand said layer of resin composition.

This invention can be more fully understood from the following detailed description when taken in conjunction with the accompanying drawings, in which.

The preferred embodiments of this invention will hereinafter be described with reference to the accompanying drawings.

In the practice of the present method, the first step is to provide a layer of photo-setting and expandable resin composition in the presence or absence of a substrate. As used herein, the term "light" comprehends ultraviolet and visible radiation. Also, the "setting" of a resin composition means not only the coversion into what is called an insoluble and infusible state, but also any change in the viscoelastic properties of the resin composition when heated to become molten that takes place due to the polymerization or crosslinking reaction among its ingredients and prevents its expansion. The photo-setting and expandable resin composition may consist of a resin composition containing a blowing agent, a photosensitizer, and a reactive plasticizer.

The resin which is used in the photo-setting and expandable resin composition may be any resin that can be expanded, and may also be one which can be plasticized externally. Preferred resins include, but not limited to, the following thermosetting resins: polyvinyl chloride, polyvinyl acetate, polystyrene, polymethacrylates such as polybutyl methacrylate, cellulose derivatives such as cellulose acetate, and synthetic rubbers such as acrylonitrile-butadiene rubber (NBR). Bipolymers or terpolymers consisting of any one of the foregoing resins and one or two other components may also be used. They include for example, bipolymers or terpolymers consisting of vinyl chloride and one or two components selected from vinyl acetate, ethylene, acrylic esters, methacrylic esters, acrylonitrile, vinylidene chloride, vinyl caproate, vinyl pelargonate, vinyl laurate, vinyl myristate, vinyl palmitate, propylene, isobutylene, dodecyl vinyl ether, vinyl fluoride, vinyl bromide, propylene chloride, trifluoroethylene, trifluoropropylene, and acrylamide.

The blowing agent which is present in the photo-setting and expandable resin composition may be selected from organic azo blowing agents such as azodicarbonamide; organic hydrozide blowing agents such as 4,4'-oxybis (benzene sulfonyl hydrazide) and p-toluenesulfonyl hydrazide; organic nitroso blowing agents such as N,N'-dinitrosopentamethylenetetramine; inorganic blowing agents such as sodium hydrogencarbonate and boron sodium hydride; and combinations thereof. Physical blowing agents such as hexane, heptane, and Freon may also be used with the aid of suitable techniques such as saturation of the resin with a microcapsulated blowing agent.

The photosensitizer which is present in the photo-setting and expandable resin composition is a light aclivated polymerization initiator, and may be one which itself has no ability to initiate polymerization. Useful photosensitizers include, but not limited to, sulfur compounds such as tetramethylthiuram disulfide, dibutyl sulfide, benzyl disulfide, and decyl phenyl sulfide; carbonyl compounds such as diacetyl, benzophenone, benzil, and benzoin; halogenated derivatives of these carbonyl compounds; derivatives, such as alkyl ethers, of these carbonyl compounds; halogen compounds such as carbon tetrachloride and 2-naphthalenesulfonyl chloride; peroxides such as di-t-butyl peroxide and benzoyl peroxide; pigments such as methylene blue and eosine; and nitrogen compounds such as azobisisobutyronitrile and benzenediazonium chloride. However, alkyl ethers of benzoin such as ethyl, isopropyl, and butyl ethers of benzoin are preferably employed.

The reactive plasticizer which is present in the photo-setting and expandable resin composition may be any compound that can be polymerized and cured by the action of light. Useful reactive plasticizers include vinyl compounds such as acrylic esters, methacrylic esters, and alkyl esters. In particular, such vinyl compounds having 2 or more ethylenically unsaturated groups in the molecule may be effectively employed. Among others, methacrylic or acrylic esters such as 1,6-hexanediol dimethacrylate, trimethylolpropane triacrylate, ethylene glycol diacrylate, and pentaacrythritol tetraacrylate, and allyl esters such as diallyl phthalate are most preferably employed.

Figure 7:
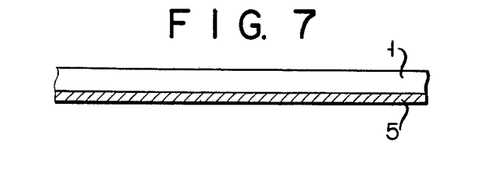
FIGS. 7 through 9 are diagrams illustrating still another embodiment of this invention in which a stepwise emblossed surface is formed.

If the surface of the above-described resin composition containing a blowing agent, a photosensitizer, and a reactive plasticizer is exposed to light, that portion of the resin composition which has been exposed to the light will be cured due to the polymerization or crosslinking reaction of the reactive plasticizer present therein, and thus prevented from expanding during a subsequent heating step. The photo-setting and expandable resin composition is usually deposited on a substrate. FIG. 7 illustrates a substrate 5 on which a layer 1 or resin composition containing a blowing agent, a photosensitizer, and a reactive plasticizer is deposited. The substrate may be made of any material such as plastic film, metal, paper, wood, or inorganic materials. Also, it may be either incorporated in the finished article or removed in a subsequent step. Although the substrate performs its function as a support, it can be omitted if the layer of resin composition itself is resistant to such tension and heat as may be applied in the course of processing.

In the practice of the present method, the surface of the layer of resin composition thus deposited on the substrate is exposed to partially screened light to form a cured portion and an uncured portion therein. In order to obtain the partially screened light, there are a number of means as described below.

1. A design is printed directly on the surface of the layer of resin composition with an ink having the property of screening light.

2. A transfer paper on which a design is printed with an ink having the property of screening light is used to transfer the design to the surface of the layer of resin composition.

3. A transparent film provided with an area having a different degree of light-screening effect is laminated to the surface of the layer of resin composition.

4. Light is applied to the surface of a layer of resin composition in a spotty manner.

5. Only the portion to be cured is exposed to light with the aid of a properly designed mask.

Finally, the layer of resin composition in which a cured portion and an uncured portion have been formed through exposure to the light partially screened by any of the above-described means is heated and thereby expanded. As a result, the uncured portion is allowed to expand under normal operating conditions while the cured portion is prevented from expanding, whereby an expanded article having an embossed surface is obtained.

In addition to the blowing agent, photosensitizer, and reactive plasticizer, a substance having an ultraviolet-screening property may also be present in the resin composition. Then, because of the presence of the substance having an ultraviolet-screening property, exposure to ultraviolet light causes the resin composition to be cured only superficially, and not internally. Therefore, when the resin composition is heated, the cured superficial part is prevented from expanding while the inner part and the portion screened from ultraviolet light are allowed to expand, thus giving a unique configuration. As a result, an expanded article having a smooth depressed surface as well as excellent physical and chemical properties is obtained.

In connection with several embodiments which differ mainly in the manner of screening light, the present invention will hereinafter described with reference to the accompanying drawings. Although ultraviolet light is used in the following description, it is to be understood that similar results can also be achieved with visible light.

First, the present invention is illustrated by an embodiment in which the surface of the layer of resin composition is printed with an ink having an ultraviolet-screening effect.

Figure 1:
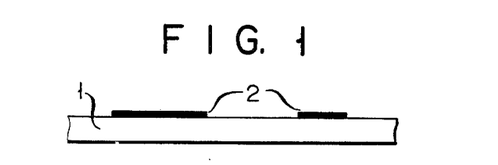
FIGS. 1 through 3 are diagrams illustrating one embodiment of this invention in which the layer of resin composition is printed with an ink having an ultraviolet-screening effect.

In FIG. 1, a sheet 1 is made of a resin composition containing a blowing agent, a photosensitizer, and a reactive plasticizer, and then a desired design 2 is printed on its surface with an ink having an ultraviolet-screening effect. If it is desired to minimize the difference in ultravilet-screening effect between inks of different colors, any of the well-known ultraviolet-absorbers, for example, of benzoin and benzophenone types may be used.

Figure 2:
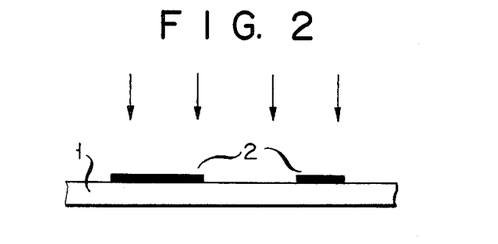

Thereafter, as shown in FIG. 2, the printed surface of sheet 1 is exposed to ultraviolet light coming from the direction of the arrows. Then, the polymerization or crosslinking reaction of the reactive plasticizer present in the resin composition takes place, so that the melt viscosity of the resin composition when heated to elevated temperatures is increased.

Figure 3:
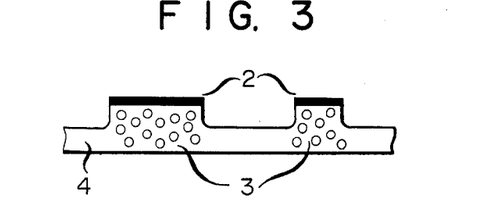

Finally, the sheet of resin composition which has been exposed to ultraviolet light is heated and thereby expanded. As shown in FIG. 3, the printed portion 3 is allowed to expand under normal operating conditions, while the unprinted portion 4 is prevented from expanding by the setting or the increase in melt viscosity of the resin composition when heated to elevated temperatures. As a result, the surface of printed portion 3 is raised and the surface of unprinted portion 4 remains depressed, whereby a high-quality expanded sheet having an embossed surface is obtained.

As used herein, the ink having an ultraviolet-screening effect means an ink which contains a substance having an ultraciolet-screening effect. The coloring materials, such as pigments and dyes, which are normally present in the ink may be employed as the substance having an ultraviolet-screening effect. However, substances which are commonly known as ultraviolet absorbers and fluorescent pigments are preferably employed. These substances, when added in relatively small amounts, can display its ultraviolet-screening effect without exerting any appreciable influence on the color tone of the ink. The ink need not necessarily be colored or opaque, but may be colorless or transparent. Any of the conventional pigments and dyes may be present in the ink. Ultraviolet absorbers which may be used in the ink include, for example, salicylic acid derivatives such as phenyl salicylate, p-octylphenyl salicylate, and p-t-butylphenyl salicylate; benzophenone derivatives such as 2,4-dihydroxybenzophenone, 2-hydroxy-4-methoxybenzophenone, 2,2'-dihydroxy-4-methoxybenzophenone, 2,2'-dihydroxy-4,4'-dimethoxybenzophenone, 2,2'-dihydroxy-4,4'-dimethoxy-5-sulfobenzophenone, 2-hydroxy-4-methoxy-2'-carboxybenzophenone, 2-hydroxy-4-methoxy-5-sulfobenzophenone trihydrate, 2-hydroxy-4-n-oxtoxybenzophenone, 2-hydroxy-4-octadecyloxybenzophenone, 2,2',4,4'-tetrahydroxybenzophenone, 4-dodecyloxy-2-hydroxybenzophenone, 2-hydroxy-4-(2-hydroxy-3-methacryloxy)-propoxybenzophenone, and 2-hydroxy-4-benzyloxybenzophenone; benzotriazole derivatives such as 2-(2'-hydroxy-5'-methylphenyl)benzotriazole, 2-(2'-hydroxy-3,5'-di-t-butylphenyl)benzotriazole, 2-(2'-hydroxy-3-t-butyl-5'-methylphenyl)-5-chlorobenzotriazole, 2-(2'-hydroxy-3', 5'-di-t-butylphenyl)-5-chlorobenzotriazole, and 2-(2'-hydroxy-4'-n-octoxyphenyl)benzotriazole; benzoic acid derivatives such as resorcinal monobenzoate, 2,4-di-t-butylphenyl 3,5-di-t-butyl-4-hydroxybenzoate, and methyl o-benzoylbenzoate; and 2-ethylhexyl 2-cyano-3,3-diphenylacrylate, ethyl 2-cyano-3,3-diphenylacrylate, oxanilide derivatives, etc. Fluorescent pigments such as 2,5-bis(5'-t-butylbenzoxazolyl)-thiophene may also be used. The printing of the surface of the layer of resin composition with an ink having an ultraviolet-screening effect can be carried out by using any of the well-known printing techniques.

Figure 4:
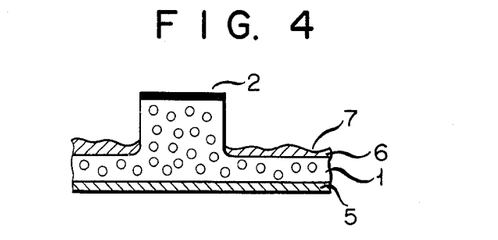
FIG. 4 is a sectional view of an expanded article made, according to this invention, of a resin composition which contains a substance having an ultraviolet-screening effect.

FIG. 4 is a sectional view of an expanded article made of a resin composition which contains a substance having an ultraviolet-screening property. Only the superficial part 6 of layer 1 of resin composition is cured to give a smooth depressed surface 7.

In the above-described embodiment, the depressed surface of the expanded article may be either left unprinted or printed solely with an ink which can transmit ultraviolet light. It is impossible to print the depressed surface with an ink having a deep or dark color and hence a significant ultraviolet-screening effect. This will impose severe limits on the decorative aspects, such as design, color tone, etc., of the finished articles because useful inks are restricted in type, concentration, and thickness. This problem can be solved by a succeeding embodiment in which, after exposure to ultraviolet light, a second design is printed with any desired ink.

Figure 5:
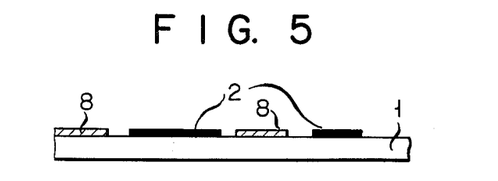
FIGS. 5 and 6 are diagrams illustrating another embodiment of this invention in which, along with a first design printed with an ink having an ultraviolet-screening effect, a second one is printed with any desired ink.

In this embodiment, a layer 1 of resin composition on which, as shown in FIG. 1, a desired design has been printed with an ink 2 having an ultraviolet-screening effect is exposed to ultraviolet light to cure (or crosslink) the unprinted portion of layer 1 of resin composition. Thereafter, as shown in FIG. 5, a second design is printed with an ink 8. For this purpose, ink 8 may be chosen without regard to its transmissivity to ultraviolet light. The second design printed with ink 8 is typically located on the surface of layer 1 of resin composition exclusive of the portion having the first design printed thereon with ink 2. However, it is to be understood that the second design may overlap the first one.

Figure 6:
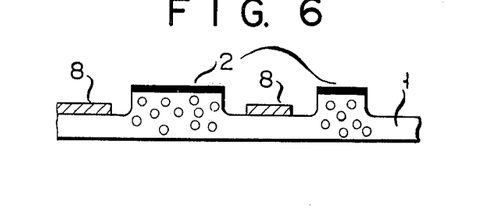

Next, the layer 1 of resin composition is heated to decompose the blowing agent and thereby expanded. Then, as shown in FIG. 6, the portion having the first design thereon is alllowed to expand and thereby gives a raised surface, while the remaining portion having at least part of the second design thereon is prevented from expanding and thereby gives a depressed surface. In this manner, an expanded article having a pattern of indentations registered to a printed design can be obtained.

The present invention is further illustrated by another embodiment in which printed designs having different degrees of ultraviolet-screening effect are provided so as to give an expanded article having a more complicated, stepwise embossed surface.

Figure 8:
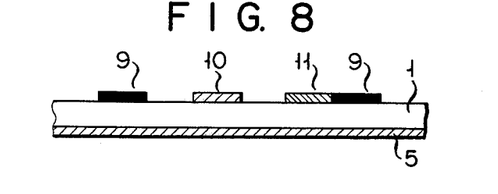

As shown in FIG. 8, a layer 1 of resin composition containing a blowing agent, a photosensitizer, and a reactive plasticizer is deposited on a substrate 5. On the surface of layer 1 of resin composition are provided a printed design 9 having the effect of screening ultraviolet light almost completely, a printed design 10 having a less degree of ultraviolet-screening effect than that of printed design 9, and a printed design 11 whose ultraviolet-screening effect is intermediate between those of printed designs 9 and 10. After these printed designs have been provided, the surface of layer 1 of resin composition is exposed to ultraviolet light. As a result, the crosslinking reaction of the reactive plasticizer present in the resin composition takes place to the greatest extent in the unprinted portion, and to decreasing extents in the portions provided with printed designs 10, 11 and 9 in this order. After exposure ultraviolet light, other printed designs may be provided without consideration for their ultraviolet-screening properties.

Figure 9:
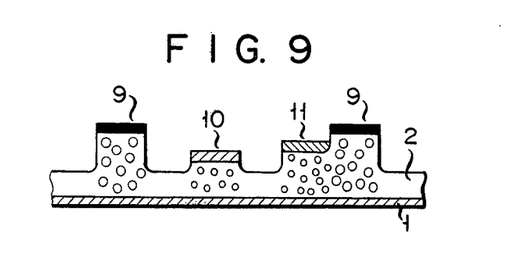

The layer 1 of resin composition which has been exposed to ultraviolet light is heated and thereby expanded. Then, as shown in FIG. 9, the unprinted portion is prevented from expanding whereas the portion having printed design 9 thereon is allowed to expand to the greatest extent. The portions having printed designs 10 and 11 thereon are expanded to the respective intermediate extents, thus forming a stepwise embossed surface. Although stepwise indentations are illustrated in FIG. 9, any of the well-known printing techniques described below may be used to change the ultraviolet-screening effect of the ink layer almost continuously and thereby form an expanded article having a pattern of continuously changing indentations.

In this embodiment, the printed designs having different degrees of ultraviolet-screening effect can be provided, for example, by modifying the composition of the ink, by changing the printing process or printing condition, or by a combination of both. These techniques will be described below in greater detail.

If it is desired to provide the printed designs having different degrees of ultraviolet-screening effect by modifying the composition of the ink, this may be done by varying the proportion in the ink of a substances, such as ultraviolet absorber or organic fluorescent pigment, which displays an ultraviolet-screening effect in small amounts and shows no appreciable color to the naked eye; or a substance, such as white pigment, colored pigment, or colored dye, which is normally present in the ink.

If it is desired to provide the printed designs having different degrees of ultraviolet-screening effect by changing the printing process or printing condition, any of the techniques well known in the art may be used. Typical of them are control of the quantity of deposited ink by regulating the viscosity of the ink; utilization of the differences in quantity of deposited ink among printing processes such as letterpress printing, lithography, intaglio printing, mimeographing, etc.; and control of the quantity of deposited ink by changing the number of screen lines of the plate in the same printing process; adjustment of the thickness of desosited ink and the percentage of inked surface by varying the shape of dots with the same number of screen lines, the depth of the plate in the case of lighography, the opening ratio or stencil thcikness in the case of mimeographing, or the like.

In the above-described embodiments, the surface of the layer of resin composition was printed with an ink having an ultraviolet-screening effect. However, an expanded article having an embossed surface can also be obtained by transferring a design from a transfer paper instead of printing it. In this case, the transfer paper has a desired design formed of an ink having an ultraviolet-screening effect.

Next, still another embodiment of this invention will be described in which light is partially screened by preparing a transparent film provided with an area having a different degree of ultraviolet-screening effect and laminating it to the surface of the layer of resin composition.

In this embodiment, a transparent film which has been provided in advance with an area having a different degree of ultraviolet-screening effect is laminated to the surface of a layer of resin composition containing a blowing agent, a photosensitizer, and a reactive plasticizer. Thereafter, the surface is exposed to ultraviolet light to cause the polymerization or crosslinking reaction of the reactive plasticizer present in the resin composition, and then heated. As a result, the cured portion is prevented from expanding while the remaining portion was allowed to expand, and the transparent film is simultaneously fused to the expanded layer, whereby an expanded article having an embossed surface is obtained. The transparent film, when laminated to the layer of resin composition in advance of exposure to ultraviolet light, may be bonded loosely so far as it will not slip out of place in the course of processing. If necessary, an adhesive may also be used.

The transparent film which is used in this embodiment may be any film that is transparent to visible and ultraviolet light, will soften or become molten during the heating step, and can be provided with an area having a different degree of ultraviolet-screening effect by such means as printing. Preferably, films of thermoplastic resins such as polyvinyl chloride, polyethylene, polypropylene, and polystyrene are employed because they do not undergo deterioration during the heating step.

The transparent film can be provided with an area having a different degree of ultraviolet-screening effect, for example, by printing the transparent film with an ink having an ultraviolet-screening effect, by transferring a design formed of an ink having an ultraviolet-screening effect from a transfer paper to the transparent film, by coating the transparent film partially with a substance having an ultraviolet-screening effect, or by laminating another film having an ultraviolet-screening effect to the transparent film.

The printing of the transparent film with an ink having an ultraviolet-screening effect may be carried out by using any of the well-known printing techniques. The transparent film may either be printed on the outer surface (the surface which will become the exposed surface of the finished article) or on the inner surface (the surface which will adjoin the layer of expandable resin composition). However, the inner surface is preferred from the viewpoint of protection of the ink layer. For a film, such as polyolefin film, which is hard to print in itself, its printing surface may either be subjected to activation treatment such as corona discharge treatment or coated with a primer prior to printing.

Figure 10:
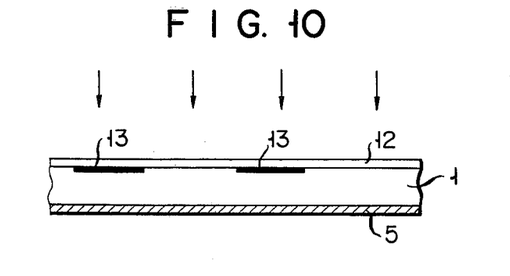
FIGS. 10 through 13 are diagrams illustrating still another embodiment of this invention in which a transparent coating is provided.

This embodiment will be more specifically described with reference to the accompanying drawings. As shown in FIG. 10, a layer 1 of resin composition containing a blowing agent, a photosensitizer, and a reactive plasticizer is deposited on a substrate 5, and then a transparent film 12 provided with an area having a different degree of ultraviolet-screening effect by use of an ink 13 having an ultraviolet-screening effect is laminated to the surface of layer 1 of resin composition. When the surface of layer 1 of resin composition is exposed to ultraviolet light coming from the direction of the arrows, the crosslinking or polymerization reaction of the reactive plasticizer and hence the setting of the resin composition take place in the portion not covered by ink 13 having an ultraviolet-screening effect.

Figure 11:
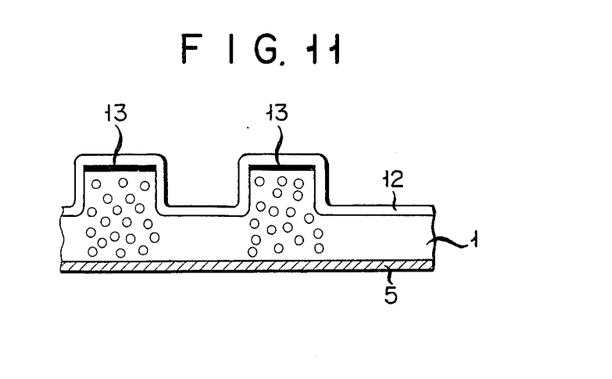

After exposure to ultraviolet light, the resin composition is heated and thereby expanded. Then, the portion covered by ink 13 having an ultraviolet-screening effect is allowed to expand due to the foaming of the blowing agent, because the crosslinking or polymerization reaction of the reactive plasticizer and hence the setting of the resin composition have not occurred in this portion. Thus, the portion covered by ink 13 having an ultraviolet-screening effect gives a raised surface, while the remaining portion gives a depressed surface. FIG. 11 is a sectional view of the resulting expanded article having an embossed surface which is provided with a transparent coating layer.

In FIGS. 10 and 11, the transparent film was provided with an area having a different degree of ultraviolet-screening effect by use of a single ink having an ultraviolet-screening effect. However, the transparent film may be provided with a plurality of areas having different degrees of ultraviolet-screening effect by use of a plurality of inks having various degrees of ultraviolet-screening effect. In this manner, there can be obtained an expanded article having an embossed surface in which stepwise or continuously changing indentations are formed according to the degrees of ultraviolet-screening effect. This embodiment is illustrated in FIGS. 12 and 13.

Figure 12:
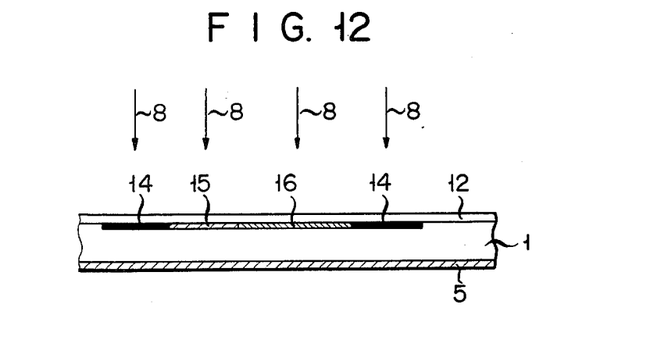

As shown in FIG. 12, the inner surface of a transparent film 12 is provided with inks 14, 15 having the same degree of ultraviolet-screening effect and with an ink 16 having a lower degree of ultraviolet-screening effect than inks 14, 15. This transparent film is laminated to a layer 1 of resin composition containing a blowing agent, a photosensitizer, and a reactive plasticizer. The surface of layer 1 of resin composition is exposed to ultraviolet light coming from the direction of the arrows, and then heated.

Figure 13:
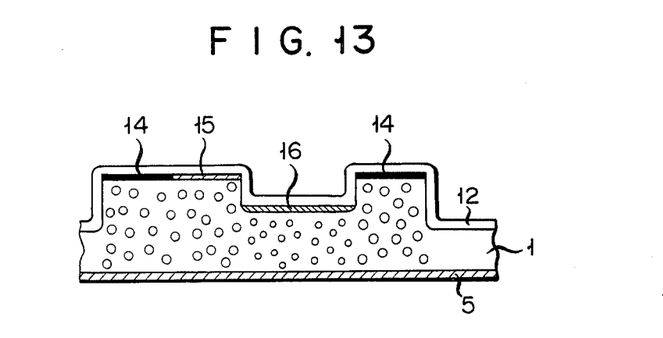

As shown in FIG. 13, the layer 1 of resin composition is expanded according to the degrees of ultraviolet-screening effect, whereby an expanded article having a stepwise indented surface is obtained. That is, the portions covered by inks 14, 15 having the highest degree of ultraviolet-screening effect are expanded to the greatest extent, the portion covered by ink 16 having a lower degree of ultraviolet-screening effect than ink 14, 15 is expanded to a less extent, and the remaining portion is hardly expanded.

As previously stated, the transparent film can be provided with printed designs having different degrees of ultraviolet-screening effect, for example, by modifying the composition of the ink or by changing the printing process or printing conditions.

The above-described embodiment in which light is partially screened by laminating a transparent film provided with an area having a different degree of ultraviolet-screening effect to the surface of a layer of resin composition has several advantages, over the preceding embodiment in which light is partially screened by printing a layer of resin composition directly with an ink having an ultraviolet-screening effect. In the latter embodiment, some kinds of resin compositions cannot easily be printed, wound up, or stored by ordinary methods. Moreover, since the ink layer is exposed on the surface of the finished article, an overcoating layer should be provided if it is desired to obtain a resistant surface. However, these problems can be solved by the use of a transparent film.

In order to partially screen the light to which the surface of a layer of resin composition is exposed, there are some other means than those described above. That is, as previously stated, light may be applied to the surface of the layer of resin composition by optional means, for example, in a spotty manner, or only that portion of the layer of resin composition which is desired to be cured may be exposed to light with the aid of a properly designed mask. These means can also give excellent expanded articles having an embossed surface.

As described above, the method of this invention involves the formation of an embossed surface by locally modifying the properties of the resin composition. Therefore, thermal decomposition of the blowing agent is almost perfectly accomplished throughout the resin composition, so that the influence of any undercomposed blowing agent on the finished articles is avoided. Moreover, since it is unnecessary to accelerate or retard the decomposition of the blowing agent itself, a wide variety of blowing agents maybe employed as contrasted with the prior art methods requiring the use of a certain group of chemical blowing agents. The expanded articles manufactured by the present method are useful in applications, such as wall, floor, or other interior covering materials, wrapping materials, and decorative materials, which require a pattern of indentations registered to a printed design.

In order that those skilled in the art may better understand the method of this invention, the following examples are given by way of illustration and not by way of limitation.

EXAMPLE 1

A plastisol having the following composition was prepared.

| Ingredient | Parts by Weight |
|---|---|
| Polyvinyl chloride | 100 |
| Di-2-ethylhexyl phthalate | 30 |
| Trimethylolpropane dimethacrylate | 30 |
| Ethylether of benzoin | 1 |
| Azodicarbonamide | 3 |
| Stabilizer (Ca-Zn complex) | 3 |

Release paper was coated with the above plastisol, and then heated at 120° C. for 1 minute to form a sheet having a thickness of 0.3 mm. On the surface of the sheet, a desired design was printed with an ink containing 2% by weight of 2-(2'-hydroxy-5'-methylphenyl)-benzotriazole. The printed surface was exposed, for 5 minutes, to light radiating from an 80W/cm high-pressure mercury vapor lamp, and then expanded by heating at 200° C. for 90 seconds.

As a result, an expanded sheet having a pattern of indentations was obtained in which the printed and unprinted portions were 1.5 and 0.7 mm thick, respectively.

EXAMPLE 2

A plastisol having the following composition was prepared.

| Ingredient | Parts by Weight |
|---|---|
| Polyvinyl chloride | 100 |
| Di-2-ethylhexyl phthalate | 40 |
| Trimethylolpropane diacrylate | 30 |
| Methyl ether of benzoin | 1 |
| Azodicarbonamide | 3 |
| Stabilizer (Ca-Zn complex) | 3 |
| Eposidized soybean oil | 5 |
| Calcium carbonate | 10 |

Release paper was coated with the above plastisol, and then heated at 100° C. for 2 minutes to form a sheet having a thickness of 0.5 mm. On the surface of this sheet, a desired design was printed with a black (opaque) ink. The printed surface was exposed, for 3 minutes, to light radiating from an 80W/cm high-pressure mercury vapor lamp, and then expanded by heating at 200° C. for 2 minutes.

As a result, an expanded sheet having a pattern of indentations was obtained in which the printed and unprinted portions were 2.0 and 1.0 mm thick, respectively.

EXAMPLE 3

A PVC plastisol having the following composition was prepared.

| Ingredient | Parts by Weight |
|---|---|
| PVC paste resin(homopolymer) | 100 |
| Di-2-ethylhexyl phthalate | 23 |
| Di-n-butyl phthalate | 22 |
| Trimethylolpropane triacrylate | 15 |
| Ethyl ether of benzoin | 0.7 |
| Azodicarbonamide | 4 |
| Zn type stabilizer | 4 |

Backing paper for wall paper having a basis weight of 80g/m$^2$ was coated with the above plastisol to a thickness of 200±20μ, and heated in an oven at 120° C. for 1 minute until the plastisol was gelled to form a printable sheet.

On the other hand, three inks having the following compositions were prepared.

Ink A: A common ink for PVC having 5% by weight of 2-hydroxy-4-methoxybenzophenone added thereto.

Ink B: A common ink for PVC having 1% by weight of 2-hydroxy-4-methoxybenzophenone added thereto.

Ink C: A common ink for PVC (mainly comprising a PVC-PVA binder and a ketone solvent).

After the PVC plastisol is gelled, the above sheet was gravure printed in three colors with inks A, B, and C so that they would not overlap one another. Then, the sheet was passes at a speed of 40 m/min through an ultraviolet-light irradiation apparatus having a 40W/cm high-pressure mercury vapor lamp, during which its printed surface was exposed to ultraviolet light at a distance of 10 cm from the lamp. Thereafter, the sheet was expanded by heating at 190° C. for 1 minute in an oven, and then allowed to cool. As a result, a vinyl wall-covering material having a pattern of stepwise indentations registered to the printed design was obtained in which the portion printed with ink A was 1180–1250μ thick, the portion printed with ink B was 350–450μ thick, the portion printed with ink C was 190–200μ thick, and the unprinted portion was 190–200μ thick.

EXAMPLE 4

A plastizol-coated sheet similar to that of Example 3 was gravure printed with ink A. In this example, a photoengraved plate of continuous gradation made by the Poschel method was employed for gravure printing. After printing, the sheet was exposed to ultraviolet light and expanded according to the same procedure as in Example 3. As a result, a vinyl wall-covering material having a relief-like pattern of continuously changing indentations registered to the printed design was obtained in which the highlight portion was about 200μ thick and the shadow portion was about 980μ thick.

EXAMPLE 5

A plastisol having the following composition was prepared.

| Ingredient | Parts by Weight |
| --- | --- |
| PVC-PVA copolymer paste resin | 100 |
| Di-2-ethylhexyl phthalate | 19 |
| Di-n-butyl phthalate | 30 |
| 1,6-Hexanediol dimethacrylate | 16 |
| Methyl ether of benzoin | 0.8 |
| 4,4'-Oxybis (benzene sulfonyl hydrazide) | 10 |
| Ca-Zn type stabilizer | 3 |
| Eposidized soybean oil | 3 |
| Calcium carbonate | 10 |

Asbestos paper having a basis weight of 200g/m² was coated with the above plastisol to a thickness of about 350μ, and then heated in an oven at 115° C. for 2 minutes until the plastisol was gelled to form a printable sheet.

On the other hand, the following inks were prepared.

Ink A: The medium of a common ink for PVC (transparent, colorless ink containing no colorant) having 10% by weight of 2,5-bis(5'-t-butylbenzoxazolyl)thiophene added thereto.

Ink B: A common ink for PVC having 10% by weight of 2,5-bis(5'-t-butylbenzoxazolyl)thiophene added thereto.

Ink C: A common ink for PVC (pale color).

In D: A common ink for PVC (thick Indian ink).

According to substantially the same procedure as in Example 3, the above sheet was gravure printed and exposed to ultraviolet light, as follows:

The sheet was printed with inks A, B, and C in this order. Then, it was passed under a high-pressure mercury vapor lamp at a speed of 20m/min, and finally printed with ink D.

Thereafter, the sheet was heated at 185° C. for 2 minutes in an oven, and then allowed to cool. As a result, an expanded sheet for floor covering use having a complicated surface was obtained in wihch the portion printed with ink A was raised without regard to the printed design, the portion printed with B was raised in register with the printed design, the portion printed with ink C was slightly raised in register with the printed design, and the portion printed with ink D was not raised but provided with the printed design.

EXAMPLE 6

A sheet was prepared according to the same procedure as in Example 5. After completion of exposure to ultraviolet light, the sheet was coated with a plastisol having the following composition, in an amount of about 100g/m².

| Ingredient | Parts by Weight |
| --- | --- |
| PVC-PVA copolymer resin | 100 |
| Di-2-ethylhexyl phthalate | 40 |
| Butyl benzyl phthalate | 20 |
| Ca-Zn type stabilizer | 3 |
| Finely divided aluminum hydroxide powder | 10 |

Thereafter, the sheet was similarly heated at 185° C. for 2 minutes. As a result, an expanded sheet for floor covering use having a complicated surface provided with a transparent coating layer was obtained.

EXAMPLE 7

A PVC plastisol having the following composition was prepared.

| Ingredient | Parts by Weight |
| --- | --- |
| PVC homopolymer (paste resin) | 100 |
| Di-2-ethylhexyl phthalate | 25 |
| Di-n-butyl phthalate | 22 |
| 1,6-Hexanediol dimethacrylate | 15 |
| Isopropyl ether of benzoin | 0.6 |
| Azodicarbonamide | 3 |
| Stabilizer | 3 |

Polyester release paper was coated with the above plastisol to a thickness of 0.3 mm, and then heated at 125° C. for 1 minute until the plastisol was gelled to form a printable sheet. On the other hand, a non-rigid PVC film (0.2 mm thick, colorless and transparent) containing 40 parts by weight of a plsticizer was prepared, and then gravure printed on one side with a common gravure ink for non-rigid PVC having 5% by weight of 2,5-bis(5'-butylbenzoxazoly) thiophene added thereto. Thus, a film having an ultraviolet-screening area was formed.

The above film was laminated to the above sheet, as shown in FIG. 10. The film-coated surface of the sheet was exposed, for 10 seconds, to light radiating from an 80 W/cm high-pressure mercury vapor lamp, heated at 195° C. for 2 minutes, and then allowed to cool. Thereafter, the release paper was removed. As a result, an expanded article having an embossed surface provided with a transparent coating layer was obtained in which the portion having the printed design was raised and the remaining portion was depressed (see FIG.11).

EXAMPLE 8

A plastisol having the following composition was prepared.

| Ingradient | Parts by Weight |
|---|---|
| PVC-PVA copolymer (paste resin) | 85 |
| EVA copolymer | 15 |
| Di-2-ethylhexyl phthalate | 28 |
| Di-2-ethylhexyl adipate | 5 |
| Di-n-butyl phthalate | 17 |
| Trimethylolpropane triacrylate | 18 |
| Ethyl ether of benzoin | 0.6 |
| 4,4'-oxybis (benzene sulfonyl hydrazide) | 6 |
| Stabilizer | 3 |

Backing paper for wall paper (with the whole surface printed beforehand with an ink containing a white pigment) having a basis weight of 80 g/m² was coated with the above plastisol to a thickness of 0.2 mm, and then heated at 120° C. for 1 minute until the plastisol was gelled to form a sheet.

On the other hand, a non-rigid PVC film (0.2 mm thick, colorless and transparent) containing about 50 parts by weight of a plasticizer was prepared, and then gravure printed on one side with the following three inks.

Ink A: A common ink for non-rigid PVC having 5% by weight of 2-hydroxy-4-methoxybenzophenone added thereto.

Ink B: A common ink for non-rigid PVC (containing no coloring pigment having 7% by weight of 2-hydroxy-4-methoxybenzophenone added thereto.

Ink C: A common ink for non-rigid PVC (indigo blue) cut to about ⅛ the concentration with the medium (diluting ink).

The above film was laminated to the above sheet. The film-coated surface of the sheet was exposed, for 10 seconds, to light radiating from an 80 W/cm high-vacuum mercury vapor lamp, heated at 175° C. for 2 minutes, and then allowed to cool. As a result, an expanded sheet having an embossed surface provided with a transparent coating layer was obtained in which the portions printed with inks A and B were most strongly expanded to give a raised surface, the portion printed with ink C was slightly expanded, and the unprinted portion was hardly expanded to give a depressed surface. Its appearance and properties were suitable for use as wall paper.

EXAMPLE 9

An expandable sheet having the following composition was prepared.

| Ingredient | Parts by Weight |
|---|---|
| PVC homopolymer resin | 100 |
| Di-2-ethylhexyl phthalate | 20 |
| Di-2-ethylhexyl adipate | 10 |
| Trimethylolpropane trimethacrylate | 15 |
| Isobutylether of benzoin | 0.7 |
| Azodicarbonamide | 2.5 |
| Stabilizer | 3 |
| Lubricant | 0.5 |

On the other hand, a non-rigid PVC film (0.2 mm thick, colorless and transparent) containing 40 parts by weight of a plasticizer was prepared, and then gravure printed on one side with a common ink for non-rigid PVC containing 7% by weight of 2-(2'-hydroxy-5'-methylphenyl) benzotriazole and a common ink for non-rigid PVC not containing it.

The above film was laminated to the above sheet, while at the same time, cloth was laminated to the back of the sheet. The film-coated surface of the sheet was exposed, for 10 seconds, to light radiating from an 80 W/cm high-pressure mercury vapor lamp, heated in hot air at 200° C. for 2 minutes, and then allowed to cool. As a result, an expanded sheet having an embossed surface provided with a transparent coating layer was obtained in which only the portion having the design printed with the 2-(2'-hydroxy-5'-methylphenyl) benzotriazole-containing ink was raised.

EXAMPLE 10

A PVC plastisol having the following composition was prepared.

| Ingredient | Parts by weight |
|---|---|
| PVC homopolymer (paste resin) | 100 |
| Di-2-ethylhexyl phthalate | 25 |
| Di-n-butyl phthalate | 18 |
| Epoxidized soybean oil | 5 |
| 1,4-butanediol dimethacrylate | 15 |
| Isopropyl ether of benzoin | 0.6 |
| Azodicarbonamide | 3 |
| Stabilizer | 3 |

White cardboard having a basis weight of 250 g/m² was coated with the above plastisol to a thickness of 0.4 mm, and then heated at 125° C. for 2 minutes until the plastisol gelled to form a sheet.

On the other hand, a non-rigid PVC film (0.2 mm thick, colorless and transparent) containing 40 parts by weight of a plasticizer and an aluminum foil (20μ thick) having a large number of punched holes were prepared. Then, the PVC film, aluminum foil, and sheet were stacked in this order.

The film-coated surface of the above laminated sheet was exposed, for 10 seconds, to light radiating from an 80 W/cm high-pressure mercury vapor lamp, heated in hot air at 200° C. for 2 minutes, and then allowed to cool. As a result, an expanded composite article having a decorative embossed surface provided with a transparent coating layer was obtained in which only the portion covered by the aluminum foil was raised.

EXAMPLE 11

A plastisol having the following composition was prepared.

| Ingredient | Parts by Weight |
|---|---|
| PVC homopolymer resin | 50 |
| PVC-PVA copolymer resin | 50 |
| Di-2-ethylhexyl phthalate | 23 |
| Di-n-butyl phthalate | 35 |
| Di-2-ethylhexyl adipate | 7 |
| 4,4'-oxybis (benzene sulfonyl hydrazide) | 7 |
| Epoxidized soybean oil | 5 |
| Ca-Zn type stabilizer | 3 |
| Calcium carbonate | 10 |
| White pigment (ultraviolet-screening substance) | 5 |

On the other hand, an ink having the following composition was prepared.

| Ingredient | Parts by Weight |
| --- | --- |
| 1,6-propanediol dimethacrylate | 50 |
| Methyl ethyl ketone peroxide | 1 |
| Cobalt naphthenate | 0.02 |
| Coloring pigment | 3 |
| Extender pigment | 12 |
| Dispersing agent | small amount |
| Di-2-ethylhexyl phthalate | 32 |

Backing paper for wall paper having a basis weight of 80 g/m$^2$ was coated with the above plastisol to a thickness of about 200μ, and then heated at 120° C. for 1 minute until the plastisol gelled to form a sheet. The sheet was gravure printed with the above ink, and heated first at 140° C. for 3 minutes and then at 180° C. for 1 minute. As a result, an expanded article having an embossed surface was obtained in which the printed portion gave a granulated, depressed surface.

What we claim is:

1. A method for the manufacture of interior covering materials comprising the steps of providing a layer of a photo-setting and expandable resin composition containing a blowing agent, a photosensitizer and a reactive plasticizer, applying a colored design on the surface of said layer of resin composition with a light-screening substance, exposing the surface of said layer of resin composition to light to cause the reactive plasticizer contained in the layer not applied by the colored design to polymerize thereby causing the resin composition whose surface is not applied by the colored design to have a higher melt viscosity than the resin composition whose surface is applied by the colored design, and then heating said layer of resin composition to expand the colored design-applied portions of said layer of resin composition to form an embossed design registered to a colored design.

2. A method of claim 1 wherein said resin composition further contains a light-screening substance.

3. A method of claim 1 wherein said light is partially screened by the light-screening ink with which a design is printed on the surface of said layer of resin composition.

4. A method of claim 1 wherein said light is partially screened by the light-screening ink with which a design is transferred to the surface of said layer of resin composition.

5. A method of claim 1 wherein, after exposure to said light, a second design is printed on the surface of said layer of resin composition with any desired ink.

6. The method of claim 3 wherein said printed design has a light-screening property varying in degree according to the location.

7. A method of claim 4 wherein said transferred design has a light-screening property varying in degree according to the location.

8. A method of claim 6 wherein said light-screening property varying in degree according to the location is achieved by providing the surface of said layer of resin composition with at least two printed designs having different light-screening properties.

9. A method of claim 8 wherein said at least two printed designs having different light-screening properties are obtained by employing at least two printing inks of different composition.

10. A method of claim 8 wherein said at least two printed designs having different light-screening properties are obtained by changing the thickness of the printing ink.

11. A method of claim 8 wherein said at least two printed designs having different light-screening properties are obtained by changing the number of screen lines of the printing plate and hence the density of printed dots.

12. A method of claim 1 wherein said light is partially screened by a transparent film provided with an area having a different light-screening property, said transparent film being laminated to the surface of said layer of resin composition.

13. A method of claim 12 wherein said an area having a different light-screening property is provided by printing said transparent film with an ink containing a light-screening substance.

14. A method of claim 13 wherein said light-screening substance comprises at least two members selected from the group consisting of an ultraviolet absorber, a fluorescent pigment, a white pigment, a colored pigment, and a colored dye.

15. A method of claim 12 wherein said area having a different light-screening property are provided by laminatin a light-screening film to said transparent film.

16. A method of claim 12 wherein said printing with an ink containing a light-screening substance is carried out on that surface of said transparent film which adjoins the surface of said layer of resin composition.

* * * * *